No. 632,035. Patented Aug. 29, 1899.
A. G. ANDERSON.
ICE FLOOR FOR SKATING RINKS, &c.
(Application filed Feb. 18, 1899.)
(No Model.)

Witnesses
Inventor
Andrew Greig Anderson

UNITED STATES PATENT OFFICE.

ANDREW GREIG ANDERSON, OF EDINBURGH, SCOTLAND.

ICE FLOOR FOR SKATING-RINKS, &c.

SPECIFICATION forming part of Letters Patent No. 632,035, dated August 29, 1899.

Application filed February 18, 1899. Serial No. 705,959. (No model.)

*To all whom it may concern:*

Be it known that I, ANDREW GREIG ANDERSON, fishmonger and ice merchant, a subject of the Queen of the United Kingdom of Great Britain and Ireland, residing at 29 Castle street, Edinburgh, Scotland, have invented new and useful Improvements in or Relating to Ice Floors for Skating-Rinks and in the Manufacture of Ice, also applicable for cooling and purifying air in dairies, hospitals, and other similar buildings and places, of which the following is a specification.

This invention relates to an improved floor for artificially freezing a horizontal stratum or sheet of water into ice for use as a skating or curling rink and for producing ice for any other purpose required, the improvements being in part applicable for cooling and purifying air in dairies, hospitals, and other similar buildings and places.

Figure 1:
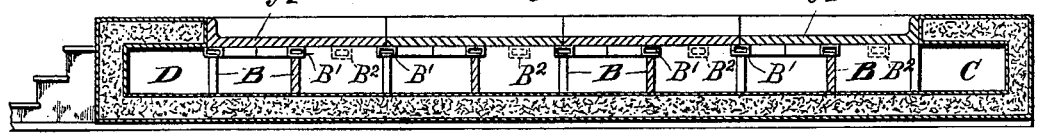
Figure 2:
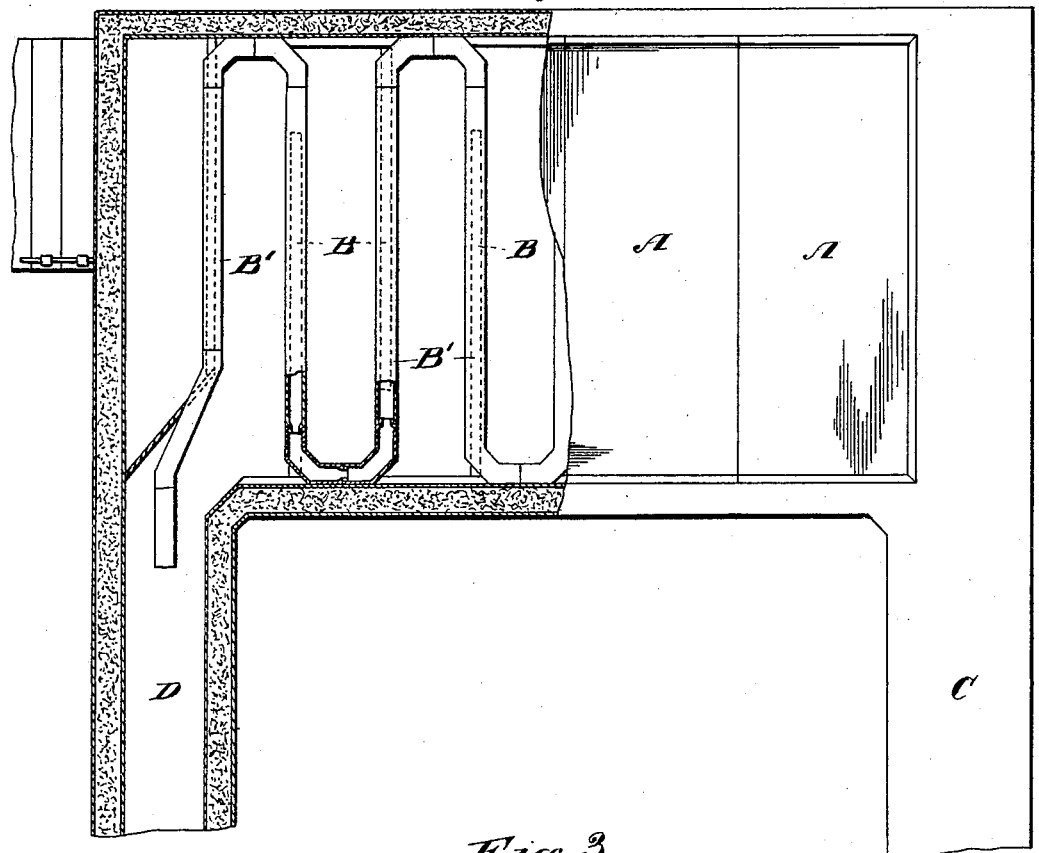
Figure 3:
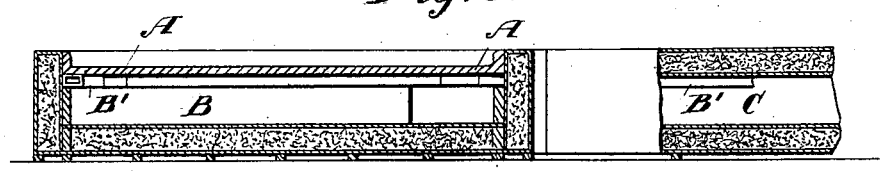

Figure 1 is a sectional elevation, Fig. 2 a plan, partly in section, and Fig. 3 a cross-section, of a portion of a skating or curling rink constructed in accordance with my invention.

Referring to the said drawings, I construct the floor A of granolithic, cement, or concrete, either in one piece or in sections, and I arrange below the said floor A parallel rows of vertical joists B, extending alternately from one side of the rink to the other side, as shown more particularly in Fig. 2, whereby the floor is supported at a distance from the ground or main floor and a continuous passage provided for the cooled air or freezing medium to circulate through, thus insuring the water being frozen evenly at all points. The said floor A does not rest directly upon the joists B, but upon a series of pipes B', arranged as shown, through which cold brine from a tank in the refrigerating-plant room is continuously or intermittently pumped. This greatly facilitates the freezing of the water on the floor A. These pipes may also be arranged between the spaces formed by the joists B, as illustrated in dotted lines at B² in Fig. 1, in place of being arranged upon the top thereof and may be employed alone for the purpose of freezing the water, if found convenient.

The air employed for freezing the water is cooled by any ordinary refrigerating-machine to preferably much lower than the freezing point of water (32° Fahrenheit) and led to the passage below the floor by the delivery-duct C, which being insulated—that is to say, protected in ordinary manner by a covering non-conductive of heat, as illustrated in section in each of the figures—enables the cooled air to be conducted from a refrigerating plant situated at a distance from the floor upon which the ice is manufactured or forced without any appreciable diminution of its cooling or freezing power. The suction-duct D for returning the air to the refrigerating plant and the ground or floor upon which the joists B are arranged are likewise insulated in any convenient way.

When the ice is required for other purposes than for use as a skating or curling rink, I increase the depth of the water, and if necessary add to it from time to time as it becomes frozen until the ice is of sufficient thickness, and in order to remove the same from the floor the current of cold air is dispensed with and a current of air heated to any required temperature substituted, thus melting the ice where in contact with the floor. It is the insulated ducts for carrying the cooled air from the refrigerating plant that are applicable for cooling and purifying the air in dairies, hospitals, and other such buildings and places, the said ducts in the case of dairies being preferably led or arranged below the tables or shelves and formed of a channel section, so that the cooled air is in direct contact with the table or shelf. The ducts may also be arranged in any convenient way when employed in hospitals and other similar buildings.

I claim—

In a floor for use as a curling or skating rink and for the production of ice for other purposes, the combination of the floor A, with the joists B, arranged alternately to each other, the ducts C, D, leading from and to the refrigerating plant and the brine-pipes B' arranged below the floor A, substantially as hereinbefore described and shown.

ANDREW GREIG ANDERSON.

Witnesses:
 JOHN GRANT CUNNINGHAM,
 ANDREW JOLLIE.